M. ARMSTRONG.
BRAKE BEAM GUARD.
APPLICATION FILED JUNE 2, 1917.

1,354,372.

Patented Sept. 28, 1920.
3 SHEETS—SHEET 1.

WITNESSES
Frederick L. Fox,

INVENTOR
M. Armstrong
BY Victor J. Evans.
ATTORNEY

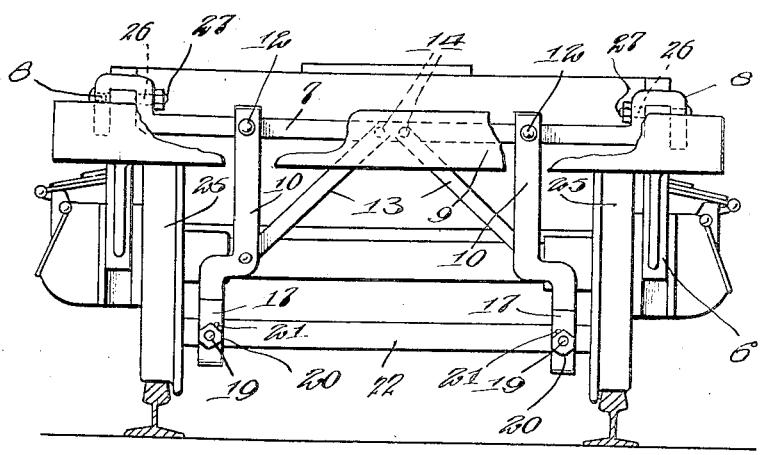
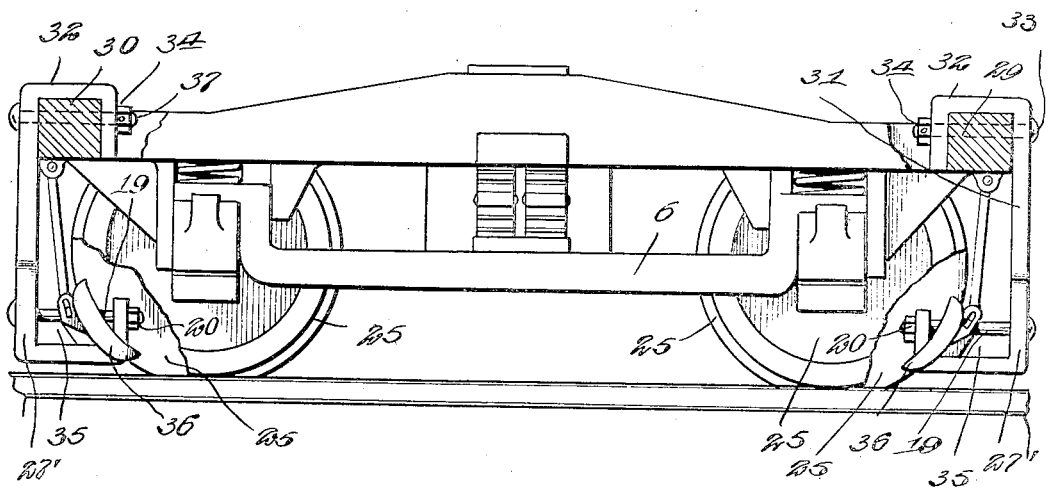

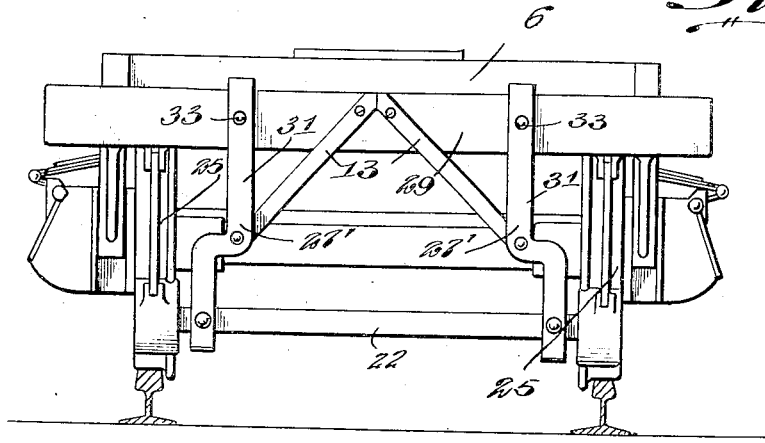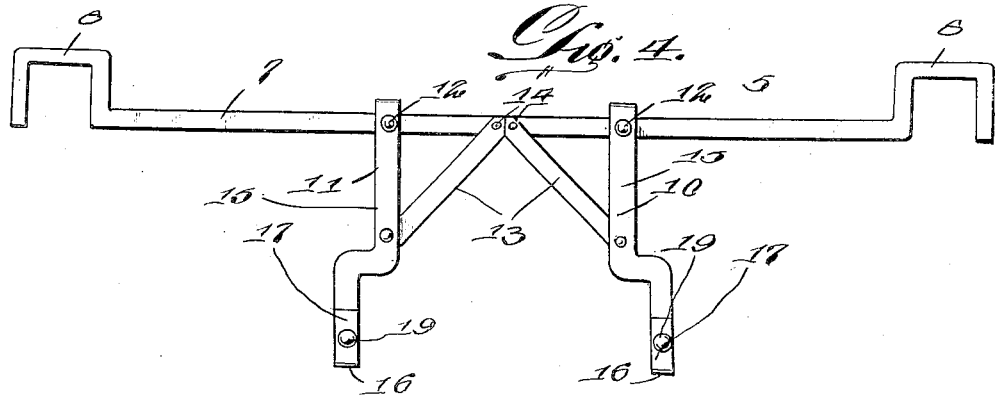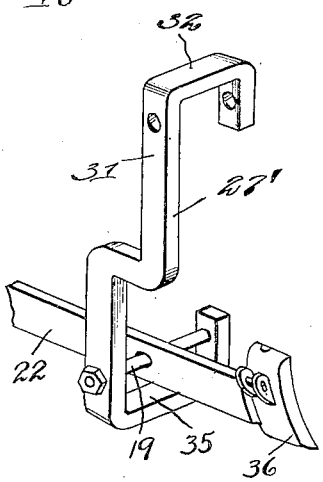

UNITED STATES PATENT OFFICE.

MARSHALL ARMSTRONG, OF HAGERSVILLE, ONTARIO, CANADA.

BRAKE-BEAM GUARD.

1,354,372.   Specification of Letters Patent.   Patented Sept. 28, 1920.

Application filed June 2, 1917. Serial No. 172,456.

*To all whom it may concern:*

Be it known that I, MARSHALL ARMSTRONG, a subject of the King of Great Britain, residing at Hagersville, in the Province of Ontario, and Dominion of Canada, have invented new and useful Improvements in Brake-Beam Guards, of which the following is a specification.

The present invention contemplates improvements in brakes generally, and has reference more particularly to that class thereunder known as guards for brake beams.

The primary object of the present invention resides in the production of a guard which will facilitate the connection of brake beams with the car truck frame, in such a manner whereby should the hangers connecting the brake beams with the truck become accidentally disconnected or broken, will prevent the brake shoes dropping upon the rails and consequently not subjecting the car to derailment.

Furthermore, I contemplate the production of a guard of the above stated character, wherein the application of the same to the truck frame can be accomplished in a simple, efficient, durable and expeditious manner.

With the above and other objects in view, the invention consists in the novel features, details of construction and combination of parts which will hereinafter be more fully set forth, illustrated in the accompanying drawings and pointed out in the appended claims.

Fig. 3 is an end view;

Fig. 4 is a side elevation of the guard removed from the truck;

Fig. 5 is a view similar to Fig. 1, showing a modified form of guard beam and mounted on the opposite end bars of the truck frame;

Fig. 6 is an end view thereof; and

Fig. 7 is a perspective view of the guard beam removed from the truck frame.

Figure 1:
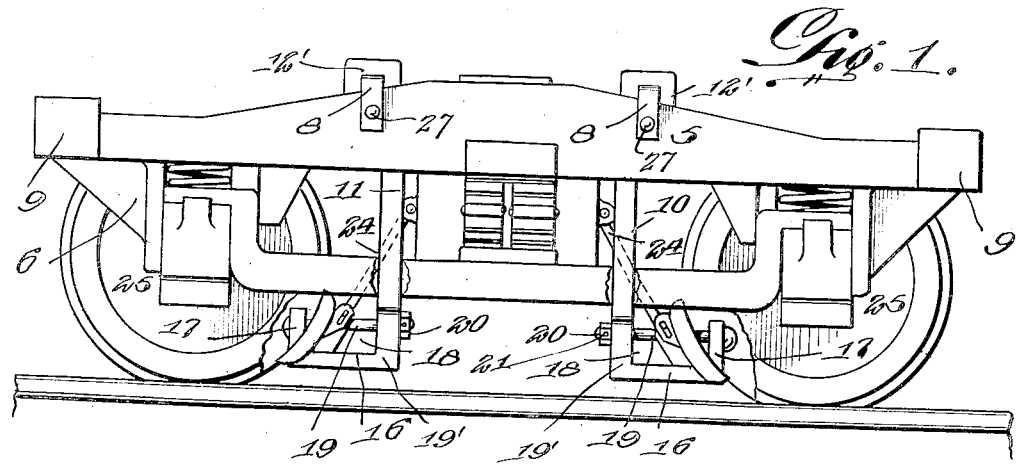
Figure 1 is a side elevation of a wheeled car truck frame showing the improved brake beam guard applied thereto.
Figure 2:
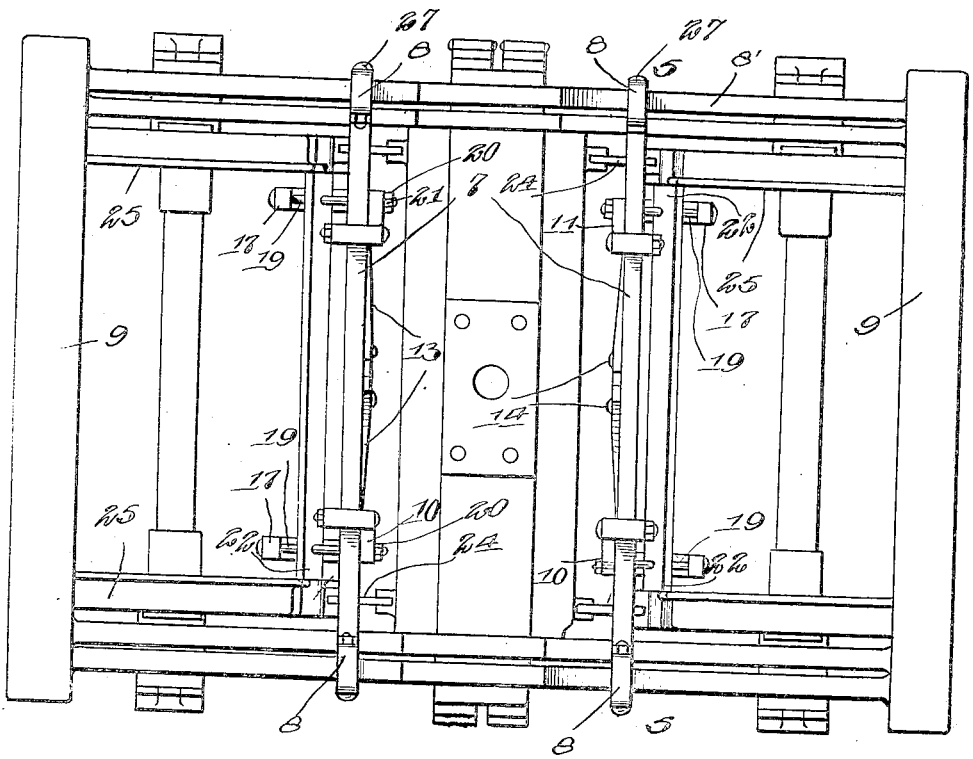
Fig. 2 is a top plan view.

Referring more particularly to the accompanying drawings, in which like characters of reference refer to corresponding parts in the several views, and reference being had more particularly to the disclosure of the invention illustrated in Figs. 1 to 4 inclusive, the improved guard for brake beams is designated generally by the reference character 5 and so constructed to permit of the mounting of the same on the car truck frame 6 in an efficient, durable and expeditious manner.

With these objects in view, provision is made of a guard of the above stated character which may be constructed of any suitable or desirable material, and embodying a drop cross frame 7 terminally formed with perpendicularly disposed inverted U-shaped clamps 8 intended to straddle the opposite side bars 8' of the truck frame, disposing the cross bars in spaced relation one to the other and transversely of the car truck frame 6 and in parallelism with the end bars 9 of said frame. To each of the transverse frames 7, at points between the respective end clamps 8 thereof, are secured a pair of supporting bars 10 and 11 respectively. Each of these supporting bars is provided with a hook-shaped upper end 12' which embrace three sides of the frames 7 and through which a suitable fastening device, indicated by the character 12, passes for rigidly connecting the brake beams to said frames. To relieve the supporting bars from any undue strain, use is made of a pair of braces 13 secured at their upper ends to the frames 7 as at 14 and connected at their lower ends to the arms 15 of the respective supporting bars 10 and 11. On the lower extremity of each of these supporting bars is formed an offset substantially U-shaped bracket 18, presenting a horizontal portion 16 terminating in an upstanding lug 17. A pivot bolt 19 traverses the U-shaped bracket 18 and is inserted through the limb 19' of the bracket and thence projected through and beyond the lug 17. A suitable nut 20 is threadedly mounted on the protruding end of the pivot bolt for holding the same against any rotary or sliding movement, and this nut is prevented from any accidental retrograde movement by a cotter pin 21. A brake beam 22 carrying the brake shoes or heads 23 is provided with an opening to permit of the pivot bolt 19 to be extended therethrough and serving to pivotally mount the brake beam thereto, and when the shoes are so assembled the latter are positioned exteriorly of the brackets 18 and adapted for horizontal rocking movement, when the pivoted links 24 are swung to brake applying or releasing position. This construction of supporting bar aids in guarding against the dropping of the brake shoe on the rail or beneath and in obstructing relation to the car wheels 25 should the links 24 become broken.

The specific type of guard heretofore termed the side frames facilitates the application of the latter to car trucks of various types, it being understood that the form of truck shown in the drawing is solely for the purpose of illustration, and the manner of connecting the supporting bars therewith, upon the installing of the guard on the truck frame, positions the brake shoes between the car wheels 25 or to so state, intermediate of the truck frame 6.

Provided in the connecting portion of each of the U-shaped clamps 8 is a centrally located opening 26 in which the bolt 27 is inserted and projected through the opposite side bars of the truck frame for establishing a firm connection of the device to the truck frame.

In Figs. 5 to 7 of the drawing is shown a slightly modified form of supporting bar applicable for brake shoes which are positioned exteriorly of the wheels instead of inwardly of the same, or so to speak, arranges the shoes at the opposite ends of the frame instead of intermediate thereof. To this end, the truck frame has suspended from the opposite end bars 29 and 30 thereof a pair of supporting bars 27' substantially similar to that shown in the preferred form of the invention, but the same differs from the latter to the extent of providing on the upper end of the arm 31 of each of the supporting bars an inverted U-shaped clamp 32. The connection of each of the supporting bars 31 with the end bars 29 and 30 is accomplished by the employment of a bolt 33 which traverses the clamp and projects through the said end bar is locked thereon by the employment of a suitable bolt and pin connection, denoted by the character 34. These supporting bars are arranged in spaced parallel relation one to the other, and each is provided on the lower end thereof with a bracket 35 similar in all respects to the bracket 18 of the supporting bars 10 and 11 respectively, and serves to support the brake shoe 36 in said bracket for a horizontal sliding movement.

What is claimed as new, is:—

1. A brake beam guard comprising a plurality of drop cross frames, spaced perpendicular supporting bars secured to each of the frames and provided with integral offset lower ends, a brake beam slidably supported in the lower offset end of each of the supporting bars and brake shoes associated with the opposite end of said brake beam.

2. In a brake beam guard, including spaced cross frames, a plurality of supporting bars connected with said frames and depending therefrom, an offset bracket provided on the lower end of each of said supporting bars, a bolt extending through said bracket, a brake beam slidably mounted on said bolt and positioned in the brackets of the supporting bars and secured therein through the medium of said bolt, and brake shoes associated with the opposite ends of said brake beam.

3. In a brake beam guard, embodying a plurality of drop cross frames, each frame being terminally provided with a clamp, a plurality of supporting bars depending from said drop cross frames and provided on the lower end thereof with an offset U-shaped bracket, a brake beam loosely mounted in the offset brackets of the supporting bars, a bolt traversing said offset brackets and passing through the brake beam and slidably supporting the beam in said offset brackets, and brake shoes associated with the free end of said brake beams.

In testimony whereof I affix my signature.

MARSHALL ARMSTRONG.